United States Patent Office 3,534,108
Patented Oct. 13, 1970

---

3,534,108
PREPARATION OF POLYTHIOETHER DITHIOLS
Bernard Audouze, Orthez, Yves Labat, Gelos, and Pierre Dereuddre, Pau, France, assignors to Societe Nationale des Petroles d'Aquitaine, Courbevoie, France
No Drawing. Filed May 8, 1967, Ser. No. 636,670
Claims priority, application France, May 9, 1966, 60,814
Int. Cl. C07c 149/10
U.S. Cl. 260—609
10 Claims

ABSTRACT OF THE DISCLOSURE

This invention relates to a process for producing polythioether dithiols of the general formula $HS(CH_2S)_nH$, wherein the coefficient $n$ is 2 to 31, by maintaining $H_2S$ in contact with a solution of a polythioether diol at a temperature in the range from 25° to 100°.

---

Various interesting industrial applications exist for the polythioether dithiols, especially in the manufacture of phenoplasts, by polycondensation with phenols, or in the production of other plastic materials, as well as the vulcanisation of rubber. As the qualities of the materials obtained depend on the composition of the dithiols which are used, it is thus desirable to be able to prepare, at will, dithiols which have desired characteristics and quite particularly a desided $n$ value. On the other hand, it is important to manufacture these products in the most convenient and economic manner.

The manufacturing processes which are already known do not give satisfaction from these two points of view. The method according to U.S. Pat. No. 3,056,841, which consists in treating formaldehyde with liquid hydrogen sulphide in a large molar excess, is rather costly, because it involves working under pressure and cannot make use of the impure gaseous $H_2S$ which is available industrially; in addition, the product obtained must be treated with an acid, with the object of eliminating the OH groups which it still contains. As regards the action of gaseous hydrogen sulphide on the aqueous formaldehyde solutions, in accordance with the prior known procedure, it never produces true polythioether dithiols, but mixtures of substances containing any OH and/or $CH_2O$ groups. On the other hand, none of the known processes permits of obtaining with certainty products with a predetermined $n$ value, even if this should be only approximately. As regards the process described in French Pat. No. 1,362,500, which uses an excess of $H_2S$ between 70° and 90° C., for the manufacture of very useful liquid $HS(CH_2S)_nH$ compounds, the extent of its application is only to a fairly narrow range of values of $n$; this process thus cannot serve for the preparation of dithiols of which the value of $n$ is outside this range.

By contrast with the prior art, the new process according to the invention permits an economic and easy manufacture on any desired scale of true polythioether dithiols which no longer contain combined oxygen; moreover, it enables compounds with an at least approximately predetermined desired value of $n$ to be obtained. It permits the production of liquid, waxy or solid dithiols, depending on requirements. Another advantage of the invention is that it can easily be carried into effect with hydrogen sulphide mixed with other gases, for example with nitrogen or carbon dioxide, without it being necessary first of all to separate and purify the said $H_2S$.

The mixtures of dithiols, obtained according to the invention, because of the absence of hydroxyl compounds, can easily be fractionated by distillation in vacuo into their constituents, and this enables polythioether dithiols with an integral and constant $n$ value to be obtained in the pure state; the process according to the invention thus provides an excellent method of obtaining compounds such as for example $HS(CH_2S)_2H$, $HS(CH_2S)_3H$, $HS(CH_2S)_4H$ etc. taken separately. On the other hand, those of the compounds which are solid or waxy at normal temperature can be purified by crystallisation in appropriate solvents.

Products according to the invention which industrially are very useful and which have so far never been produced are more particularly mixtures of several

compounds, in which one of the dithiols of which $n$ is equal for example to 2, 3, 4, 5 or 6, is found in a preponderant proportion, generally from 50% to 75% by weight.

The process according to the invention consists in maintaining one or more thioether diols in an aqueous medium in contact with hydrogen sulphide for the time necessary for the replacement of all the OH groups of the diol by SH groups.

The reaction which takes place can be represented by the equation:

(1) $HO(CH_2S)_mCH_2OH + 2H_2S \rightarrow$
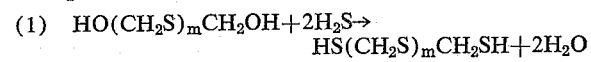
$HS(CH_2S)_mCH_2SH + 2H_2O$ it being possible for the compound obtained to be written as:

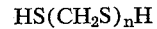

$n$ being equal to $(m+1)$. It is obvious that the progress of this reaction is controlled by the analysis of the medium in accordance with one of the known methods which permits the presence of the OH groups to be distinguished, for example by chromatography, an infra-red method, etc.

In view of the very slow speed of this reaction at temperatures below 25° C. and since it is necessary at temperatures above about 100° C. to work under pressure, it is preferable according to the invention to operate between 25° and 100° C. and particularly between 30° and 90° C.

The thioether diol which is used can be the monothioether diol $HO(CH_2S)CH_2OH$, that is to say, the first term of the series $HO(CH_2S)_mCH_2OH$, or even a polythioether diol, in which $m$ is greater than 1. Generally speaking, $m$ can assume different values, such as 1 to 30; diols which are particularly useful are those of which the coefficient $m$ is about 1 to 10, particularly monothioether diol and the dithioether, trithioether, tetrathioether and pentathioether diols, which can easily be manufactured at the present time. The process according to the invention can also be applied to complex diols containing $CH_2O$ groups, such as those which are described by way of example in French Pat. No. 1,394,209.

Depending on the length of the chain of the diol or diols which are used, that is to say, depending on the value of $m$, the said diols are dissolved or dispersed in water; this latter eventuality is generally provided for values of $m$ equal to or greater than 3, because beyond the trithioether diol, the solubility in water is more and more reduced. The water can contain an alcohol, particularly methanol, in a proportion of for example about 1 to 30%. A procedure which is very practical industrially consists in carrying out the treatment with $H_2S$ according to the invention in the same aqueous medium in which the diol itself has been prepared; this medium is generally provided by a commercial formaldehyde solution, of which the HCHO has been transformed into polythioether diols which have remained in solution and/or in suspension; it thus comprises water with the other ingredients of the starting commercial solution, particularly methanol.

The concentration of the selected diol or diols in the aqueous medium to be treated with the hydrogen sulphide can vary at will; it may in particular be of the order of 1 to 50% by weight, and possibly even weaker or stronger, independently of the solubility or insolubility of the diols in water. Nevertheless, in accordance with one unforeseen feature of the invention, the speed of the reaction (1) can be regulated by the concentration of diol in the aqueous medium; this speed is greater in proportion as the medium is more dilute. For example, the transformation of the monothioether diol at 50° C. requires 9 hours in a 30% solution, 5 hours when the solution contains 10% thereof and 3 hours only for 5%. Although it would seem logical from the point of view of the best utilisation of the capacity of the equipment to work with solutions or suspensions which have the highest possible content of the diols to be transformed, the embodiment of the invention which is preferred consists in using a rather weak concentration which, at the given temperature, permits the manufacturing process to be carried out in a reasonable time, for example in 1 to 10 hours. Because of this fact, the preferred concentrations of diols are generally about 5% to 40% by weight of the aqueous medium, and particularly 15% to 30%.

In order to produce the polythioether dithiol with a predetermined $n$ value, or a mixture of dithiols with a high content of this predetermined $n$ value, there is initially used, in accordance with one of the features of the invention, a diol of which the number of $CH_2S$ $m$ groups is equal to $(n-1)$, or even a mixture of diols with a high content of the diol of which $m=n-1$. Thus, for example, in order to manufacture tetrathioether dithiol, the trithioether diol is treated with $H_2S$.

Another factor which permits of controlling the length of the chains of the polythioether dithiols to be prepared is the temperature. It plays a particularly important part when the starting material in monothioether diol. Thus, according to a surprising feature of the invention, the mean coefficient $n$ of the dithiols obtained is greater as the temperature of the aqueous medium during the action of the $H_2S$ on the diol or diols is raised. It is for example found that, when starting with the monothioether diol, of which the theoretical transformation should lead to $n=2$, in accordance with (2) $HO(CH_2S)CH_2OH + 2H_2S \rightarrow HS(CH_2S)_2H + 2H_2O$ there is actually found on starting with a 6.1% solution of this diol, at 50° C. an average $n$=approximately 2.63
at 60° C. an average $n$=approximately 2.9
at 70° C. an average $n$=approximately 3.5
at 80° C. an average $n$=approximately 3.85
at 85° C. an average $n$=approximately 3.95

The process according to the invention is carried out by the aqueous medium containing the diol or diols being saturated with hydrogen sulphide. Although it can be effected under pressure, very good results are obtained by simply bubbling gaseous $H_2S$ into the aqueous medium at atmospheric pressure. The gas can contain other inert gases, particularly $CO_2$, which accompanies $H_2S$ in certain industrial gases.

If the introduction of the hydrogen sulphide is continued until the OH groups of the diol disappear, the yield of dithiol is very high and usually quantitative.

The products of the reaction are separated from the heavier organic phase of the aqueous medium by decantation, filtration and/or by centrifuging. Generally speaking, with a mean value of $n$ smaller than 5, this phase is an oil which can easily be decanted, and which can be fractionated by distillation under reduced pressure, into the dithiols of integral $n$ values which make up this oil; it is advisable to effect the distillation without exceeding 180° C., so as not to change the prepared products. When the average $n$ value is equal to or greater than 5, the products are generally waxy or solid products, which are also separated without difficulty from the aqueous phase; these products can be fractionated into their constituents with integral $n$ numbers by crystallisation in the usual solvents.

The following examples are intended to illustrate the invention without limiting it in any way.

EXAMPLE 1

A 2-litre reactor provided with a dipping tube for supplying $H_2S$, a thermometer and a gas outlet equipped with a reflux condenser is immersed in a thermostatically controlled bath; 0.6 mole of monothioether diol is introduced into the reactor, that is, 56.4 g., dissolved in 900 g. of water.

The solution is thus a 5.9% by weight solution.

The stirring is assured with a magnetic agitator. The temperature is brought to 50° C., and this temperature is maintained throughout the period of sulphidation, and a current of $H_2S$ is caused to pass through the solution so as to ensure a slight bubbling action; this operation lasts 10 hours. After this time, an oily liquid is obtained which is denser than water and which is separated by decantation.

Analysis of the product shows that it is a mixture of polythioether dithiols which no longer contain oxygen and of which the average or mean $n$ value is equal to 2.6.

By distillation of this mixture, there are obtained 25% of $HS(CH_2S)_2H$, 70% of trithioether dithiol, 1.5% of monothioether dithiol and 3.5% of tetrathioether dithiol.

EXAMPLE 2

0.6 mole of dithioether diol, i.e. 84 g., dissolved in 1 litre of water, is introduced into the same reactor as that of Example 1. The temperature is brought to 80° C., and this temperature is maintained throughout the period of introducing $H_2S$ into this solution.

The stirring of the aqueous medium is assured by a magnetic agitator and by bubbling in a current of $H_2S$.

After 6 hours, the flow of gas is stopped and the oil which has been deposited on the bottom of the reactor is collected by decantation.

The product obtained no longer contains an OH group. It is a dithiol $HS(CH_2S)_nH$, of which the mean value of $n$ is 3.0, and which gives on distillation 15% of $HS(CH_2S)_2H$ and 70% of $HS(CH_2S)_3H$.

EXAMPLE 3

In the same arrangement as above, 0.6 mole of trithioether dial is sulphided, that is to say, 131 g., which are suspended in 1200 ml. of water, because this diol is only partially soluble in water.

After having brought the temperature to 80° C., the contents of the reactor are stirred and $H_2S$ is introduced for 6 hours.

The product obtained is an oil which no longer contains OH groups. It is formed by a mixture of dithiols, of which the mean value of $n$ is 3.85 and from which 58% of $HS(CH_2S)_4H$ are extracted by vacuum distillation.

EXAMPLE 4

Using the same installation as in the preceding examples, 0.6 mole of tetrathioether diol (158 g.), in suspension in 1200 ml. of water, are treated by bubbling $H_2S$ into the suspension, which is kept at 90° C. for 6 hours. An oil is separated out, and this is decanted and washed. It is formed by a mixture of dithiols, of which the mean value of $n$ is 4.5. By distillation of this mixture, there are obtained 40% of $HS(CH_2S)_4H$, while the residue is for the major part formed by $HS(CH_2S)_5H$.

the mean $n$ value is 3.85. Vacuum distillation of this product supplies the following dithiols:

| | Percent |
|---|---|
| $HS—CH_2S—CH_2SH$ | 2 |
| $HS—CH_2S—CH_2S—CH_2SH$ | 22 |
| $HS—CH_2S—CH_2S—CH_2S—CH_2SH$ | 59 |
| Unidentified product | 17 |

The main constituents of the products obtained in the above examples, separated by distillation under very reduced pressure, have shown the characteristics which are set out in the following table.

TABLE

| Analyses | Polythioether dithiols | | |
|---|---|---|---|
| | $HS(CH_2S)_2H$ | $HS(CH_2S)_3H$ | $HS(CH_2S)_4H$ |
| C (percent): | | | |
| Calculated | 19.04 | 20.93 | 22.02 |
| Found | 19.03 | 20.78 | 22.09 |
| H (percent): | | | |
| Calculated | 4.76 | 4.69 | 4.59 |
| Found | 4.49 | 4.74 | 4.66 |
| S (percent): | | | |
| Calculated | 78.20 | 74.40 | 73.39 |
| Found | 76.50 | 74.30 | 72.90 |
| Molecular weight (cryoscopy): | | | |
| Calculated | 126 | 172 | 218 |
| Found | 127.1 | 172.3 | 223 |
| HS (percent): | | | |
| Calculated | 52.30 | 38.30 | 30.20 |
| Found | 51.70 | 37.90 | 29.70 |
| Refractive index at 20° C. | 1.637 | 1.661 | 1.675 |
| Density at 20° C. | 1.300 | 1.346 | 1.372 |
| Viscosity at 20° C. in centipoises | 3.03 | 10.65 | 31.50 |
| Boiling point | [1] 57 | [2] 114 | [3] 82 |

[1] At $5.10^{-1}$ mm. Hg (° C.).
[2] At 1 mm. Hg (° C.).
[3] At $10^{-2}$ mm. Hg (° C.).

EXAMPLE 5

Into a 3-litre reactor, equipped like that of Example 1, there are poured 2330 ml. of a solution of 130 g. of monothioether diol, i.e. 1385 moles, freshly prepared from a formaldehyde solution by the action of $H_2S$. The solution is brought to 60° C. and hydrogen sulphide is caused to bubble therein; the reaction takes 3½ hours.

142 g. of a mixture of polythioether dithiols with a mean $n$ value of 2.88 are obtained.

Distillation of this mixture of polythioether dithiols permits of separating out:

| | Percent |
|---|---|
| $HS(CH_2S)_2H$ | 18 |
| $HS(CH_2S)_3H$ | 70 |
| $HS(CH_2S)_4H$ (and $n>4$) | 12 |

EXAMPLE 6

The procedure of Example 5 is followed, but the temperature is contained between 25° and 30° C. After 54 hours, a mixture of polythioether dithiols is obtained, of which the mean number $n$ is equal to 2.63.

EXAMPLE 7

In a reactor with a capacity of 150 litres, equipped in the same way as those of the preceding examples, there are first of all prepared 100 litres of a solution of 45.2 kg. (0.48 kmoles) of monothioether diol from a commercial formaldehyde solution. The temperature of the solution is set at 70° C. and a mixture of 60% of $H_2S$ and 40% of $CO_2$ by volume is caused to bubble thereinto for 9 hours.

The oily layer which has been formed therein is then decanted; this layer is formed by 52 kg. of a mixture of polythioether dithiols, of which the mean value of the number $n$ is 3.6.

EXAMPLE 8

By operating as in Example 7, but for 8 hours at 80° C., there are obtained 51 kg. of product of which

What is claimed is:

1. A process for obtaining a polythioether dithiol of the formula $HS(CH_2S)_nH$, wherein $n$ is from 2 to 31, comprising the steps of maintaining hydrogen sulphide in contact with a 1 to 50% by weight concentration in aqueous medium of at least one thioether diol of formula $HO(CH_2S)_m—CH_2OH$, wherein $m$ is a number equal to $(n-1)$ at a temperature range from 25° to 100° C., and distilling the resulting product to obtain the polythioether dithiol.

2. A process as recited in claim 1, wherein the said thioether diol is the monothioether diol $$HO—CH_2S—CH_2OH$$

3. A process as recited in claim 1, wherein the temperature is in the range from 30° to 90° C.

4. A process as recited in claim 1, wherein the diol is in solution in the aqueous medium.

5. A process as recited in claim 1, wherein the diol is in suspension in the aqueous medium.

6. A process as recited in claim 1, wherein the concentration of diol in the aqueous medium is in the range from 5% to 40% by weight.

7. A process as recited in claim 1, wherein the concentration of the diol in the aqueous medium is in the range from 15% to 30% by weight.

8. A process as recited in claim 1, wherein the time of contact of reactants is in the range from 1 to 10 hours.

9. A process as recited in claim 1, wherein the temperature of the aqueous medium is maintained at a higher value as the desired number of $CH_2S$ groups per molecule of dithiol to be prepared is larger.

10. A process as recited in claim 1, wherein the speed of the process can be increased by reducing the concentration of thioether diol in the aqueous medium.

(References on following page)

References Cited

UNITED STATES PATENTS

| | | | |
|---|---|---|---|
| 3,326,982 | 6/1967 | Baspseres et al. | 260—609 |
| 2,829,171 | 4/1958 | Doumani | 260—609 |
| 3,056,841 | 10/1962 | Saegebarth | 260—609 |

FOREIGN PATENTS 1,394,209   1965   France.

OTHER REFERENCES

Theilheimer: "Syn. Methods Org. Chem.," vol 7 (1953), 625.

Theilheimer: "Syn. Methods Org. Chem.," vol. 18 (1964), 668.

CHARLES B. PARKER, Primary Examiner

D. R. PHILLIPS, Assistant Examiner